(12) United States Patent
Anater

(10) Patent No.: US 12,175,690 B2
(45) Date of Patent: Dec. 24, 2024

(54) DISPLAY APPARATUS FOR A VIDEO MONITORING SYSTEM, VIDEO MONITORING SYSTEM AND METHOD

(71) Applicant: Robert Bosch GmbH, Stuttgart (DE)

(72) Inventor: Akram Anater, Ottobrunn (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 17/505,910

(22) Filed: Oct. 20, 2021

(65) Prior Publication Data

US 2022/0122280 A1 Apr. 21, 2022

(30) Foreign Application Priority Data

Oct. 21, 2020 (DE) .......................... 102020213288.7

(51) Int. Cl.
| | |
|---|---|
| *G06T 7/33* | (2017.01) |
| *G06T 3/16* | (2024.01) |
| *H04N 7/18* | (2006.01) |
| *H04N 23/90* | (2023.01) |

(52) U.S. Cl.
CPC ................ *G06T 7/344* (2017.01); *G06T 3/16* (2024.01); *H04N 7/181* (2013.01); *H04N 23/90* (2023.01); *G06T 2200/24* (2013.01); *G06T 2207/30232* (2013.01)

(58) Field of Classification Search
CPC .... H04N 5/247; H04N 7/181; H04N 5/23299; G06T 2207/30232; G06T 7/344; G06T 2200/24; G06T 2219/028; G06T 19/00
See application file for complete search history.

(56) References Cited

U.S. PATENT DOCUMENTS

| | | | | |
|---|---|---|---|---|
| 6,697,105 | B1 * | 2/2004 | Kato | H04N 23/631 348/E7.086 |
| 8,274,564 | B2 * | 9/2012 | Girgensohn | H04N 23/90 715/243 |
| 8,531,522 | B2 * | 9/2013 | Horovitz | H04N 7/181 348/143 |
| 8,823,508 | B2 * | 9/2014 | Thiruvengada | H04N 7/183 340/520 |
| 9,851,877 | B2 * | 12/2017 | Michiyama | G06F 3/04815 |
| 2003/0085992 | A1 | 5/2003 | Arpa et al. | |
| 2008/0088706 | A1 * | 4/2008 | Girgensohn | H04N 7/181 348/207.99 |

FOREIGN PATENT DOCUMENTS

DE 102012211298 A1 1/2014

* cited by examiner

*Primary Examiner* — Boubacar Abdou Tchoussou
(74) *Attorney, Agent, or Firm* — Michael Best & Friedrich LLP

(57) ABSTRACT

A display apparatus 1 for a video monitoring system is provided, the video monitoring system being configured to monitor a monitoring area 9 having a plurality of monitoring cameras 3. In one example the display apparatus includes a model module 12 that includes a model 8 of the monitoring area 9 having the monitoring cameras 3. A display module 10 for a display device 4 is configured to display the model 8 on the display device 4. A processing module 11 is configured to select at least one of the monitoring cameras 3 as a selected monitoring camera, the selected monitoring camera defining a line of sight S. The display module 10 is configured to display the model 8 on the display device 4 in such a way that the model 8 is aligned in accordance with a model perspective on the basis of the line of sight S of the selected monitoring camera.

16 Claims, 4 Drawing Sheets

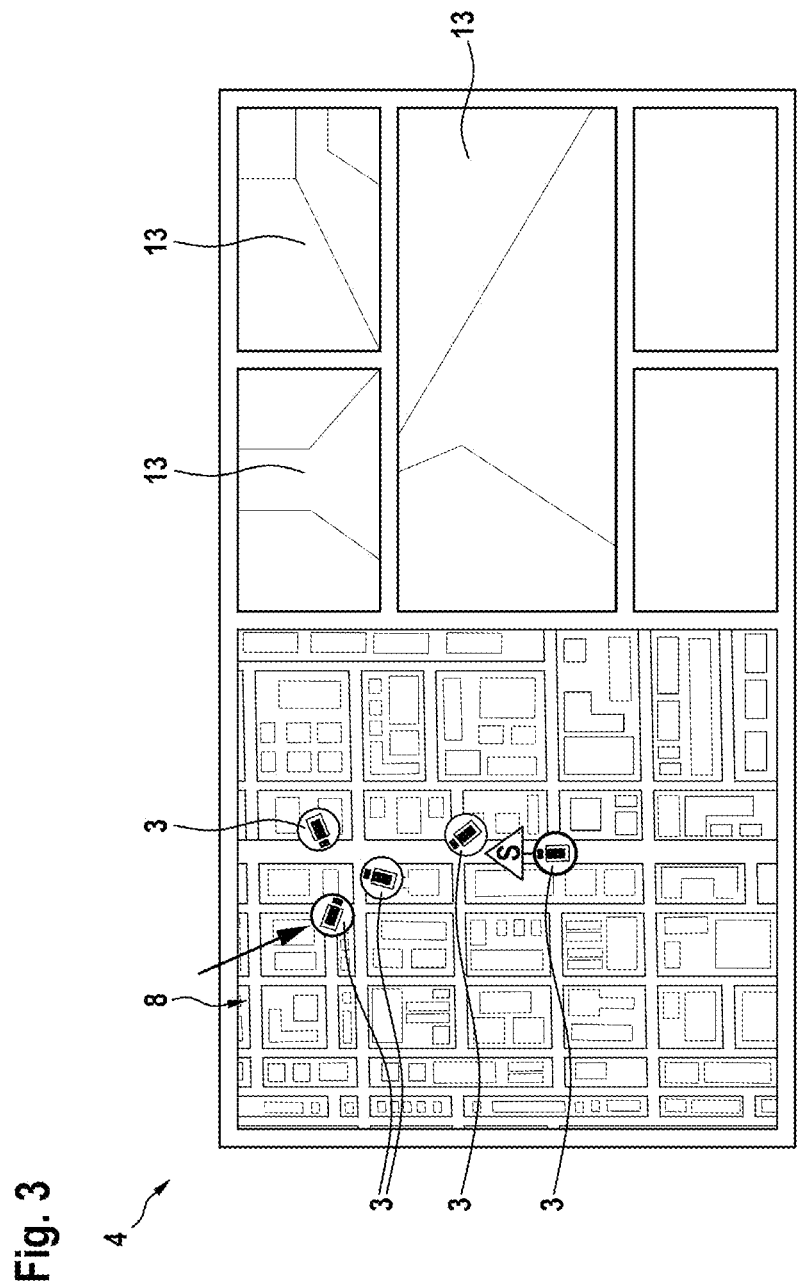

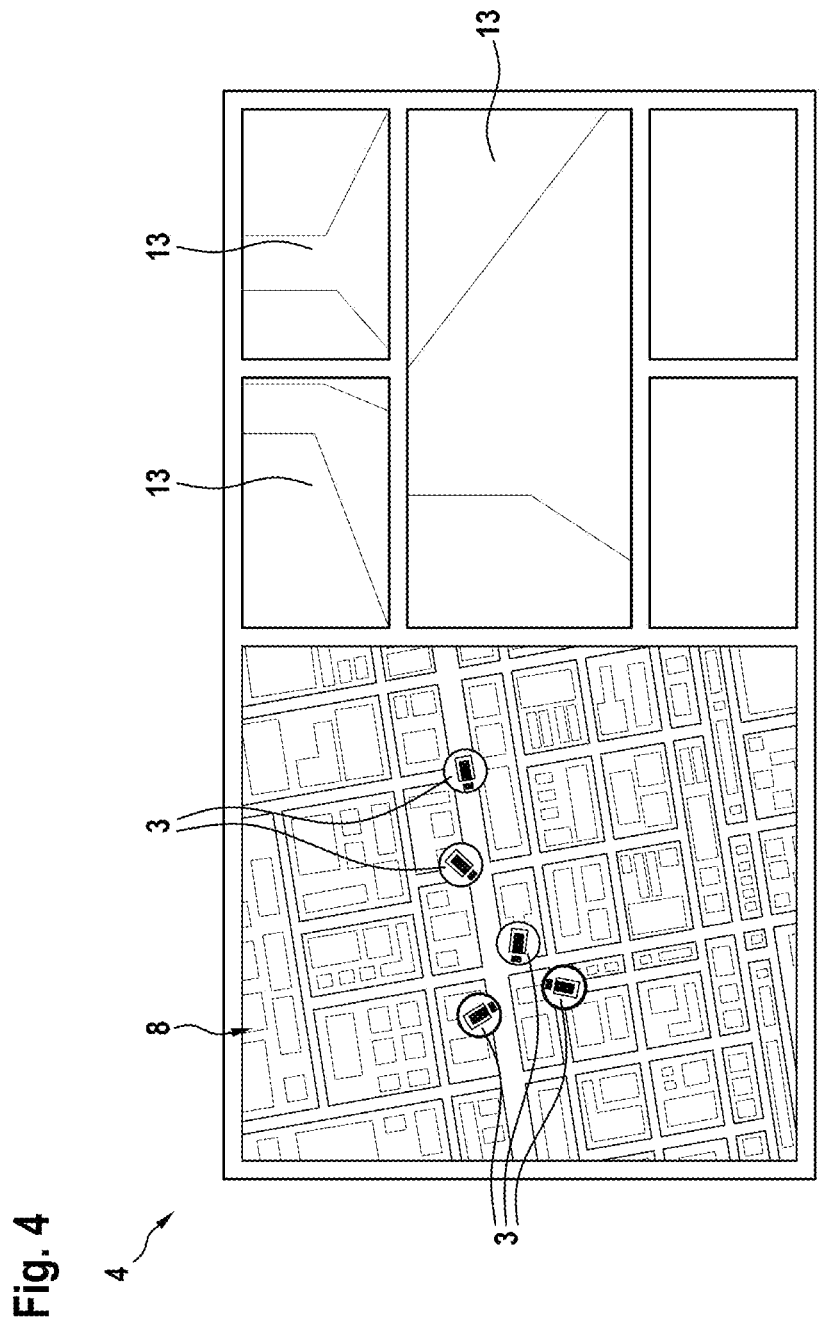

DISPLAY APPARATUS FOR A VIDEO MONITORING SYSTEM, VIDEO MONITORING SYSTEM AND METHOD

BACKGROUND OF THE INVENTION

The invention relates to a display apparatus for a video monitoring system. The invention also relates to a video monitoring system having the display apparatus and to a method.

Camera-assisted monitoring apparatuses record scenes from a monitoring area having cameras in order either to evaluate these scenes in an automated manner or to present them to monitoring personnel in a monitoring center, for example. Precisely at the interface between the monitoring apparatus and the monitoring personnel it is important for the scenes from the cameras to be reproduced clearly in order to allow the monitoring personnel to easily access the content of the scenes.

The document DE 10 2012 211 298 A1, which probably relates to the closest prior art, relates to a display apparatus for a video monitoring system, a freely selectable location in a monitoring area being able to be selected interactively and the display apparatus showing a scene from a camera that observes this location.

SUMMARY OF THE INVENTION

The subject of the invention is a display apparatus that is suitable and/or configured for a video monitoring system.

The video monitoring system is configured to monitor a monitoring area and comprises a plurality of monitoring cameras. The monitoring area may be in the form of a public place, a building, a factory hall, a school, a university, a plurality of adjoining rooms or areas, etc. The monitoring area may be in the form of a continuous monitoring area or perhaps in fragmented or split form.

The video monitoring system comprises a plurality of monitoring cameras that are in a distributed arrangement in the monitoring area. The monitoring cameras may be static monitoring cameras that either are arranged rigidly or are in the form of movable monitoring cameras, e.g. so-called PTZ (pan-tilt-zoom) cameras. It is also possible for the or some of the monitoring cameras to be in mobile form, which means that they can independently change their position in the monitoring area. The static, movable and/or mobile monitoring cameras—also able to be referred to succinctly as active monitoring cameras—can align their field of view within the bounds of their degrees of freedom. It is preferred for the video monitoring system to have at least five, preferably at least ten and in particular at least 30 monitoring cameras.

The display apparatus comprises a model module, the model module providing a model of the monitoring area having the monitoring cameras. In particular, the monitoring cameras in the model are reproduced as virtual monitoring cameras. In this way it is possible for the monitoring area and the monitoring cameras to be integrated in a common, continuous model or for the monitoring area and the monitoring cameras to be reproduced in two partial models that jointly form the model.

The model of the monitoring area particularly preferably comprises floors, walls, windows, door openings and optionally additionally stationary objects, such as e.g. furniture, production installations, fixtures, etc. The model may be in the form of a 2D model or in the form of a 3D model. There may also be provision for the model to be in the form of a plan or in the form of a depiction. The model of the monitoring cameras particularly preferably comprises the position, alignment and magnification or viewing angle of the monitoring cameras. By way of example, the model can have a position, an alignment, an up direction and a viewing angle for each monitoring camera. If the monitoring camera is in the form of an active camera with degrees of freedom, e.g. in respect of the pan angle, inclination angle, zoom factor or the viewing angle and/or the position, then areas that define the degrees of freedom can be stored for said parameters.

The model module may also be in the form of an interface that loads the model from an external data source and provides said model to the display apparatus in this manner.

The display apparatus further comprises a display module for a display device, the display module being configured to display the model on the display device. The display device may be e.g. in the form of one or more monitors. Optionally, the display device forms a component of the display apparatus and/or of the monitoring system. The display module receives the provided model and forwards said model to the display device for display.

The display apparatus has a processing module that selects at least one of the monitoring cameras as a selected monitoring camera. Preferably, the selected monitoring camera is aligned or alignable with a selected location and/or with a selected position in the monitoring area.

The monitoring camera, in particular the selected monitoring camera, has a line of sight. The line of sight is in particular defined by a center or a principal axis of the field of view of the monitoring camera.

The display apparatus may be in the form of a central system; however, it is also possible for the display apparatus to be of decentralized or partially decentralized design. By way of example, the display apparatus, in particular the modules and/or the devices, may be in the form of a server-client system, in the form of a cloud service and/or in the form of one or more digital data processing devices.

Within the framework of the invention, it is proposed that the display module be configured on a software and/or program basis to display the model on the display device in such a way that the model is aligned in accordance with a model perspective on the basis of the line of sight of the selected monitoring camera. In particular, the model perspective changes when the line of sight changes. Specifically, the model perspective is in line-of-sight-dependent form.

The invention is based on the consideration that a model perspective configured on the basis of the line of sight of the selected monitoring camera means that the model is always oriented in a predefined and consistent state. This simplifies and/or standardizes the reproduction of the model. During operation, the advantage is obtained that the model is always aligned in regard to the line of sight of the selected monitoring camera, which means that monitoring personnel can find their way around the model very quickly and intuitively as a result of the simplified and/or standardized reproduction.

In a preferred development of the invention, the display module is configured to respond to a change of the selected monitoring camera from a current selected monitoring camera to a new selected monitoring camera by aligning the model in the model perspective in regard to the line of sight of the new selected monitoring camera. Therefore, the model is always reproduced in the same model perspective in regard to the line of sight of the current selected monitoring camera.

In a preferred configuration of the invention, the model is in the form of a 2D model, in particular in the form of a map. Alternatively or additionally, there is provision for the model to be reproduced in a bird's eye view as the model perspective.

In an advantageous development of the invention, the line of sight of the selected monitoring camera or the line of sight of the selected monitoring camera when projected onto the footprint of the model, in particular of the map, is in the same direction as a top of the display device. By way of example, the display device is in the form of a screen, the line of sight and/or the projected line of sight pointing to the top parallel to the sides of the screen. This model perspective is particularly easy to implement and spontaneously and intuitively comprehensible to the monitoring personnel. In particular, a first person view (FPV) is implemented.

A change of selected monitoring camera preferably results in the model being rotated until the model perspective for the new selected monitoring camera is set. Preferably, the rotation is reproduced in the display device, as a result of which the transition is made from the old model perspective to the new model perspective.

In an alternative configuration of the invention, the model is in the form of a 3D model, the model being reproduced in the model perspective from an ego perspective of the selected camera. In this alternative configuration, the line of sight of the selected camera corresponds to the reproduced model perspective. In view of a large number of computer games, many people and hence also the monitoring personnel cope with this reproduction particularly easily.

In a further alternative, the model is reproduced in a third person perspective as the model perspective, the virtual observer appearing to stand behind the monitoring camera in an extension of the line of sight of the selected monitoring camera. In light of a multiplicity of computer games, many people and hence also the monitoring personnel cope with this reproduction particularly easily.

In a possible development, the selected monitoring camera has an adjustable field of view. By way of example, the selected monitoring camera is realized as a PTZ camera. The display module is configured to respond to a change in the field of view of the selected monitoring camera by tracking the model to the line of sight of the selected monitoring camera. The effect achieved thereby is that the model is aligned in accordance with the model perspective on the basis of the current line of sight of the selected monitoring camera.

It is particularly preferred that the selected monitoring camera is always arranged in the model perspective at the same position in regard to the display device in order to simplify the reproduction and to improve location of the selected monitoring camera. Preferably, the selected monitoring camera is arranged in the display device in a centered manner.

It is preferred that in particular adjacent monitoring cameras are reproduced in the model. In particular, these monitoring cameras can be selected in order to form new selected monitoring cameras. This addition means that if a monitoring object leaves the visual range of the selected monitoring camera then it is easily possible to locate a further monitoring camera that continues to display the monitoring object.

In a preferred development, the display module is configured to reproduce a monitoring image from the selected monitoring camera and from at least or precisely one, some or all of the adjacent monitoring cameras on the display device. There may also be provision for images from multiple adjacent monitoring cameras to be reproduced. In particular, the images are reproduced in the form of a cameo and/or matrix. Preferably, the monitoring images from the adjacent monitoring cameras are arranged in the model perspective in the correct position in relation to the monitoring image from the selected monitoring camera as in the model. Therefore, if an adjacent monitoring camera in the model is at the top left in relation to the selected monitoring camera, then the monitoring image from this adjacent monitoring camera is also arranged at the top left relative to the monitoring image from the selected monitoring camera.

It is additionally preferred that the display apparatus is configured to actuate at least one of the adjacent monitoring cameras. The actuation is effected such that the field of view of the actuated monitoring camera is directed toward the field of view of the selected monitoring camera. In this manner, it is possible to prepare for the change of monitoring cameras as selected monitoring cameras, the field of view of the adjacent monitoring camera already being pre-adjusted.

Preferably, the display apparatus has a human-machine interface, the processing module being connected to the human-machine interface for data purposes in order to use the human-machine interface to select the respective monitoring camera as the selected monitoring camera.

There may also be provision for the processing module to be configured to select the monitoring camera that is defined by way of an interactively determined position in the model and/or by way of a monitoring object as the selected monitoring camera. By way of example, a position in the model is selected interactively, in particular by way of the or a further human-machine interface, the processing module determining a monitoring camera that is directed at this position. If multiple monitoring cameras are able to capture the position, one of the monitoring cameras is determined as the selected monitoring camera on the basis of a set of rules.

A further subject of the invention relates to a video monitoring system, the video monitoring system being configured to monitor the monitoring area having a plurality of monitoring cameras, characterized by a display apparatus that is described in the claims and/or according to the description above.

A further subject of the invention relates to a method for displaying a model of a monitoring area, one monitoring camera from a plurality of monitoring cameras being selected as a selected monitoring camera. The model is subsequently displayed, the model being aligned in accordance with a model perspective on the basis of the line of sight of the selected monitoring camera.

BRIEF DESCRIPTION OF THE DRAWINGS

Further features, advantages and effects of the invention will emerge from the description of a preferred exemplary embodiment of the invention that follows and from the accompanying figures, in which:

FIGS. 2, 3 and 4 show schematic views of a display device of the display apparatus in FIG. 1.

DETAILED DESCRIPTION

Figure 1:
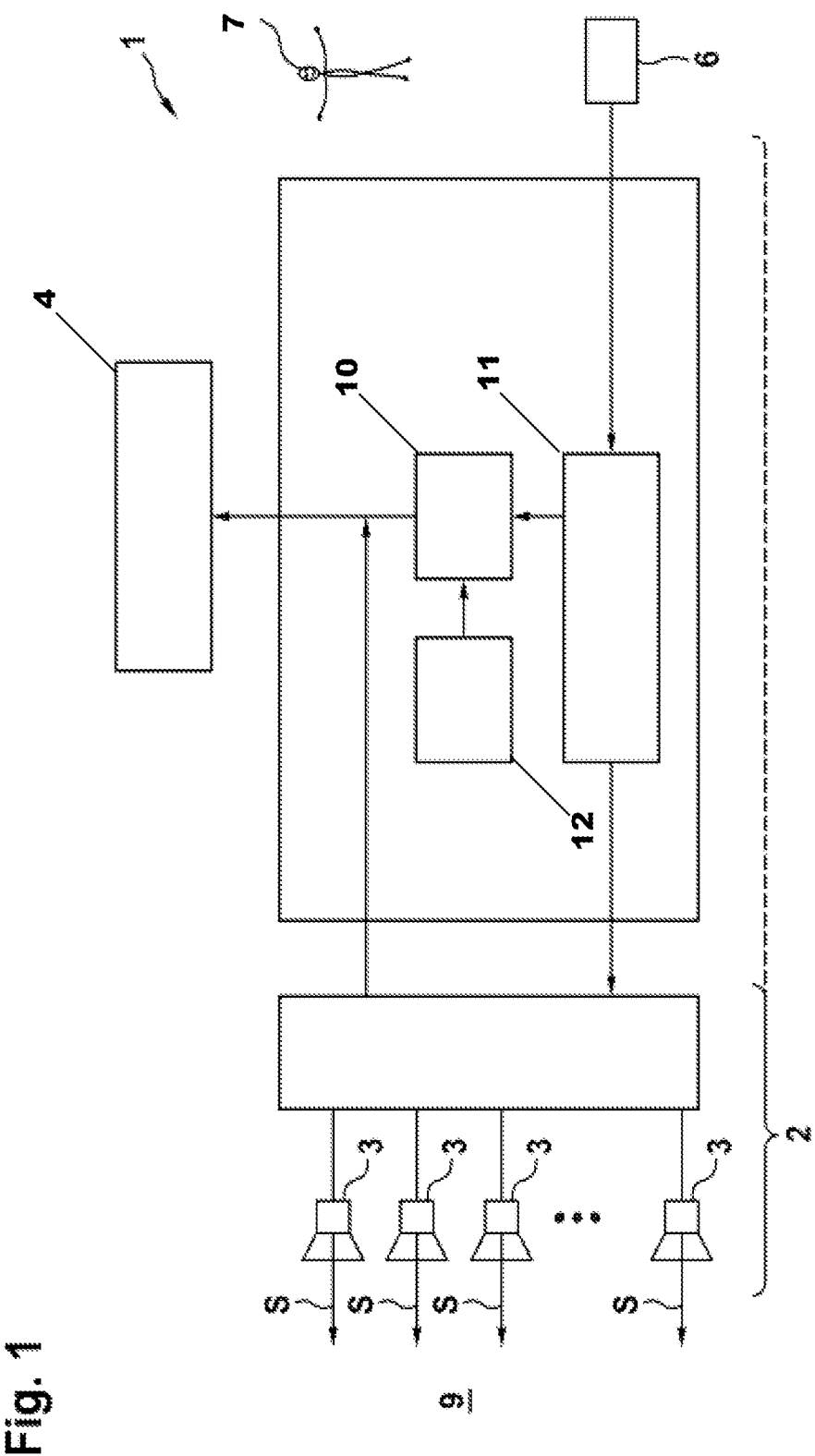
FIG. 1 shows a schematic block diagram of a display apparatus as an exemplary embodiment of the invention.

FIG. 1 uses a schematic block diagram to show a display apparatus 1 as an exemplary embodiment of the invention. The display apparatus 1 is coupled to a monitoring system 2 or forms a part of the monitoring system 2.

The monitoring system 2 comprises a plurality of monitoring cameras 3 set up in a spatially distributed manner in a monitoring area 9, such as e.g. in a building or in a public or open area or the like. The monitoring cameras 3 may be rigid monitoring cameras, movable monitoring cameras, such as e.g. PTZ cameras, or mobile monitoring cameras that can independently alter their position in the monitoring area. Optionally, the mobile monitoring cameras likewise have a PTZ functionality. The monitoring cameras 3 each have a line of sight S. The line of sight in particular corresponds to the optical axis of the monitoring cameras 3.

The monitoring system 2 and/or the display apparatus 1 comprises a display device 4 on which a model 8 of the monitoring area 9 and optionally additionally monitoring images 5 from the monitoring cameras 3 are reproducible. The display device 4 may be in the form of a screen, for example. The model 8 is provided by a model module 12.

Control over the reproduction of the model 8 on the display device 4 is provided by a display module 10. The display apparatus 1 further has a processing module 11, the processing module 11 being configured to select at least one of the monitoring cameras 3 as a selected monitoring camera. By way of example, the processing module 11 is connected to a human-machine interface 6 for data purposes, as a result of which the human-machine interface 6 can be used to select the monitoring camera 3 as the selected monitoring camera.

The display module 10 is configured to reproduce the model 8 on the display device 4 in accordance with a model perspective on the basis of the line of sight S of the selected monitoring camera 3.

From a functional point of view, monitoring personnel 7 can use the human-machine interface 6 to select a monitoring camera 3 by means of the processing module 11 as the selected monitoring camera. The display module 10 is configured to reproduce the model 8 on the display device 4 in accordance with a model perspective on the basis of the line of sight S of the selected monitoring camera. The definition of the model perspective can likewise be predefined by the model module 12

The model 8 is displayed on the display device 4 in accordance with the model perspective. Optionally additionally, monitoring images 13 from the selected monitoring camera and, on the basis of the mode of operation, from further monitoring cameras 3 can be reproduced beside one another, for example.

A change of selected monitoring camera to a new monitoring camera 3 for example by way of the human-machine interface 6 results in the processing module 11 being used to actuate the display module 10, said display module reproducing the model 8 in accordance with the same model perspective as previously on the basis of the line of sight S.

In this manner, the model 8 is always reproduced for the monitoring personnel 7 in the same model perspective in regard to the line of sight S of the selected monitoring camera. From a technical point of view, this simplifies the reproduction process; from the point of view of the application, this reproduction simplifies the intuitive grasping of the model 8 by the monitoring personnel 7.

Figure 2:
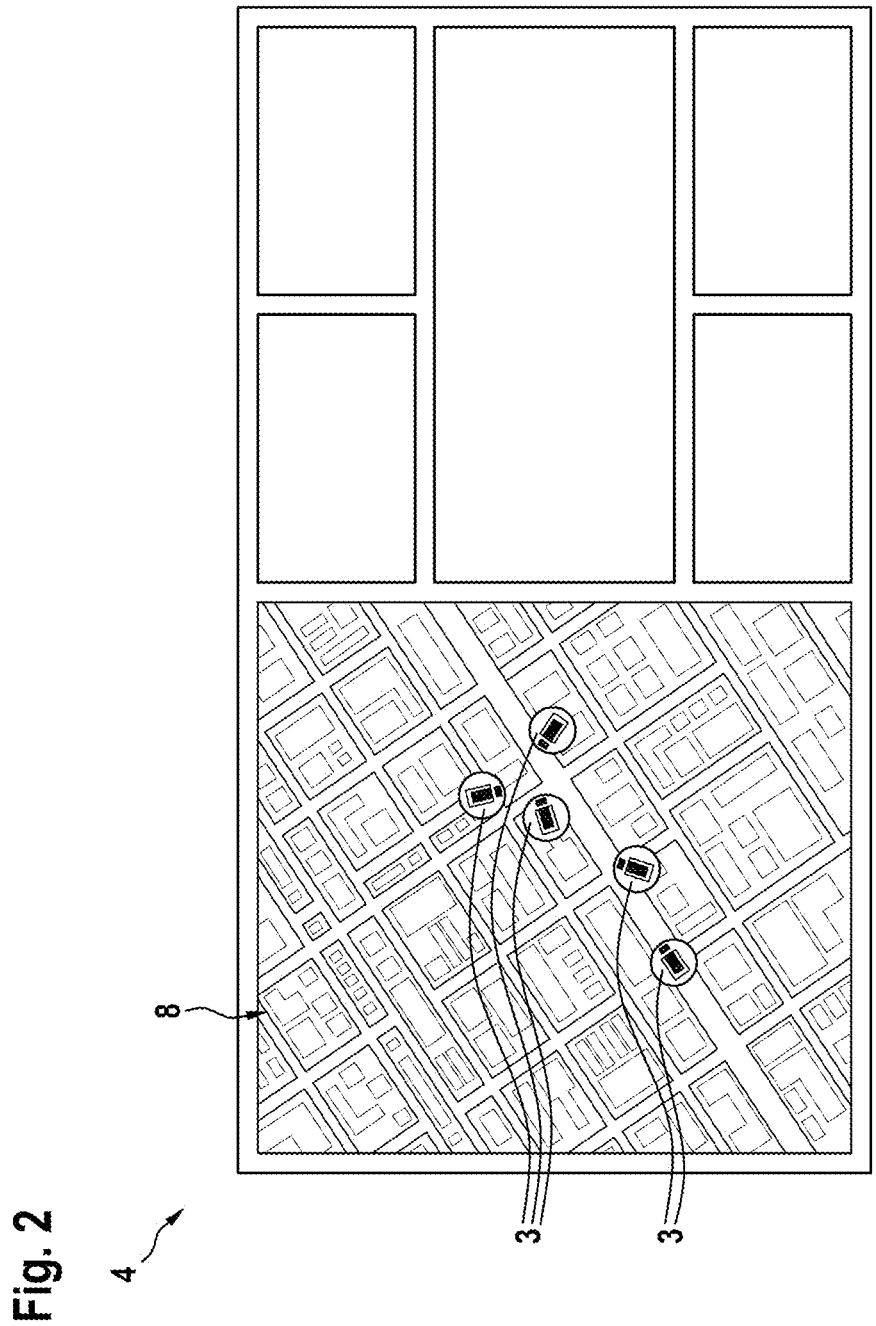

FIGS. 2, 3 and 4 each show the display device 4. The model 8 of the monitoring area 9 in different model perspectives and also monitoring images 13 from the monitoring cameras 3 are shown in each case.

In the present illustration, the model 8 is reproduced as a 2D model, a map and in particular as a satellite image of the monitoring area 9. The model 8 reproduces the monitoring cameras 3 in a model-like manner and in particular with the orientation thereof and hence the line of sight thereof discernible by the monitoring personnel 7.

The monitoring images 13 are arranged on the right-hand side of the display device 4, the monitoring image 13 from the selected monitoring camera from the monitoring cameras 3 being reproduced centrally and moreover in a magnified manner compared with the monitoring images 13 from the other monitoring cameras 3.

In FIG. 2, none of the monitoring cameras 3 have been selected. The model 8 is oriented as desired, for example the model 8 may be "north-oriented", that is to say oriented such that, using classical convention, the bearing north points upward in the reproduction. Beside the model 8, there is provision for placeholders for the monitoring images 13. These can be filled by monitoring images 13 from any monitoring cameras 3.

The monitoring personnel 7 can for example use the human-machine interface 6 to select one of the monitoring cameras 3 as the selected monitoring camera. By way of example, the human-machine interface 6 is in the form of a computer mouse, and one of the monitoring cameras 3 is clicked on.

Selecting the monitoring camera 3 as the selected monitoring camera rotates the model 8 on the display device 4 into a model perspective, the model 8 still being shown as a bird's eye view in the model perspective in FIG. 3, but having been rotated such that the line of sight of the selected monitoring camera points upward. Optionally additionally, the model 8 is centered on the selected monitoring camera in the model perspective. Furthermore, the monitoring image 13 from the selected monitoring camera is reproduced on the large placeholder. In particular the adjacent or other monitoring cameras 3 are shown on the smaller placeholders.

The oriented reproduction of the model 8 and the simultaneous display of the monitoring image 13 from the selected monitoring camera allow the monitoring personnel 7 to find their way around the model 8 particularly quickly and intuitively.

The display apparatus 1 now permits a different monitoring camera 3 to be defined as the selected monitoring camera, for example again using the human-machine interface 6. In this exemplary embodiment, the monitoring camera 3 marked by an arrow is selected as the new selected monitoring camera.

On the display device 4, the model 8 is put into the model perspective in regard to the new selected monitoring camera, in particular in regard to the line of sight of the new selected monitoring camera. This is accomplished by rotating the model 8, as a result of which the line of sight of the new selected monitoring camera now points upward. Furthermore, the model 8 is centered in regard to the new selected monitoring camera. In this case, it is irrelevant whether the model 8 is first aligned and then centered or the model 8 is first centered and then aligned. Furthermore, the monitoring image 13 from the new selected monitoring camera is reproduced in the large placeholder. The monitoring personnel can also find their way around the model 8 intuitively and quickly when the new selected monitoring camera is selected.

If the selected monitoring camera is in the form of a movable monitoring camera, in particular in the form of a PTZ monitoring camera, the model 8 is tracked in the same manner in accordance with the model perspective on the basis of the current line of sight of the selected monitoring camera. If the selected monitoring camera is panned horizontally, therefore, the model 8 is rotated in the same manner.

Since the monitoring personnel 7 intuitively understand the display device 4 and the content thereof, they do not need as much detailed knowledge in regard to the position, alignment and name of the camera.

An application scenario can proceed as follows: the monitoring personnel 7 look at monitoring images 13 from the monitoring cameras 3 live or as playback. By way of example, they are interested in an object that is in the visual range of a monitoring camera 3. They open the model 8, the model 8 containing the applicable monitoring camera 3, and the latter therefore being determined as the selected monitoring camera, and the selected monitoring camera being entered in the correct position in the model 8 as an icon. Furthermore, the model 8 is centered on the selected monitoring camera. The magnification of the model 8 is set such that adjacent monitoring cameras 3 at a predefined distance are likewise reproduced. The orientation of the model 8 is set in accordance with the model perspective such that the model 8 in regard to the selected monitoring camera is reproduced in a first person view. The monitoring images 13 from the adjacent monitoring cameras 3 in respect of the selected monitoring camera are automatically reproduced adjacently to the monitoring image 13 from the selected monitoring camera and arranged in accordance with their relative positioning in the model 8. If for example the monitoring image 13 from an adjacent monitoring camera 3 is arranged at the top left in the model 8 in regard to the selected monitoring camera, then the monitoring image from this monitoring camera 3 is likewise arranged at the top left in relation to the monitoring image 13 from the selected monitoring camera.

Optionally, there may be provision for all the movable monitoring cameras 3, in particular PTZ monitoring cameras, to be automatically adjusted such that the fields of view thereof are directed toward the selected monitoring camera.

If for example the monitoring personnel 7 see the object disappear from the field of view of the current selected monitoring camera, for example to the top left of the model 8, they can select as the new selected monitoring camera the one whose field of view the object has already entered or at least is likely to enter soon. The new selected monitoring camera is again used to determine the model perspective of the model 8 and to center the model 8.

Alternatively, the monitoring personnel 7 can also select any position in the model 8, for example by mouse click, with a monitoring camera 3 whose field of view overlaps this position being determined as the selected monitoring camera.

What is claimed is:

1. A display apparatus for a video monitoring system, the video monitoring system being configured to monitor a monitoring area having a plurality of monitoring cameras, the apparatus comprising:
   a model module, the model module providing a model of the monitoring area having the monitoring cameras,
   a display module for a display device, the display module being configured to display the model on the display device,
   a processing module, the processing module being configured to select at least one of the monitoring cameras as a selected monitoring camera, the selected monitoring camera defining a line of sight,
   wherein the display module is configured to display the model on the display device in such a way that the model is aligned in accordance with a model perspective on the basis of the line of sight of the selected monitoring camera and centered on the selected monitoring camera,
   the processing module is configured to actuate at least one monitoring camera of the monitoring cameras adjacent to the selected monitoring camera based on selecting the selected monitoring camera, the actuation directs a field of view of the at least one adjacent monitoring camera toward a field of view of the selected monitoring camera, and
   the model module is configured to set a magnification of the model based on the at least one adjacent monitoring camera that is within a predefined distance of the selected monitoring camera.

2. The display apparatus according to claim 1, wherein the display module is configured to respond to a change of selected monitoring camera by aligning the model in the model perspective in regard to the line of sight of the new selected monitoring camera.

3. The display apparatus according to claim 1, wherein the model is in the form of a 2D model and/or that the model is reproduced in a bird's eye view.

4. The display apparatus according to claim 1, wherein the model is in the form of a 3D model, the model being reproduced from an ego perspective of the selected camera.

5. The display apparatus according to claim 1, wherein the model is reproduced from a third person perspective relative to the selected monitoring camera.

6. The display apparatus according to claim 1, wherein the model is reproduced with the selected camera centered.

7. The display apparatus according to claim 1, wherein the selected monitoring camera has an adjustable field of view, the display module being configured to respond to a change in the field of view by tracking the model to the line of sight of the selected monitoring camera.

8. The display apparatus according to claim 1, wherein adjacent monitoring cameras are reproduced in the model.

9. The display apparatus according to claim 1, wherein the display module is configured to reproduce monitoring images from the selected monitoring camera and from the adjacent monitoring cameras on the display device, the monitoring images from the adjacent monitoring cameras being arranged in the model perspective in the correct position in relation to the monitoring image from the selected monitoring camera as in the model.

10. The display apparatus according to claim 1, wherein the at least one adjacent monitoring camera is actuated prior to a second selection of a different monitoring camera of the monitoring cameras.

11. The display apparatus according to claim 1, wherein the processing module is configured to select a different one of the monitoring cameras as a new selected monitoring camera, the display module being configured to display the model on the display device in such a way that the model is aligned in accordance with the model perspective on the basis of the line of sight of the new selected monitoring camera.

12. The display apparatus according to claim 11, wherein said display apparatus has a human-machine interface (HMI), the processing module being connected to the HMI for data purposes in order to determine the new selected monitoring camera.

13. The display apparatus according to claim 1, wherein the processing module is configured to select the monitoring camera that is defined by way of a position and/or an object as the selected monitoring camera.

14. A video monitoring system having a plurality of monitoring cameras, wherein the monitoring system has a display apparatus that includes
- a model module, the model module providing a model of the monitoring area having the monitoring cameras,
- a display module for a display device, the display module being configured to display the model on the display device,
- a processing module, the processing module being configured to select at least one of the monitoring cameras as a selected monitoring camera, the selected monitoring camera defining a line of sight, wherein
- the display module is configured to display the model on the display device in such a way that the model is aligned in accordance with a model perspective on the basis of the line of sight of the selected monitoring camera and centered on the selected monitoring camera,
- the processing module is configured to actuate at least one monitoring camera of the monitoring cameras adjacent to the selected monitoring camera based on selecting the selected monitoring camera, the actuation directs a field of view of the at least one adjacent monitoring camera toward a field of view of the selected monitoring camera, and
- the model module is configured to set a magnification of the model based on the at least one adjacent monitoring camera that is within a predefined distance of the selected monitoring camera.

15. A method for displaying a model on a display apparatus of a monitoring area having a plurality of monitoring cameras, the method comprising:
- selecting one of the monitoring cameras as the selected monitoring camera,
- displaying the model on the display apparatus according to a magnification setting of the model, wherein the magnification setting of the model is based on at least one adjacent monitoring camera of the monitoring cameras that is within a predefined distance of the selected monitoring camera,
- centering the model on the selected monitoring camera,
- aligning the model in accordance with a model perspective on the basis of the line of sight of the selected monitoring camera, and
- actuating the at least one adjacent monitoring camera of the monitoring cameras based on selecting the selected monitoring camera, the actuation directs a field of view of the at least one adjacent monitoring camera toward a field of view of the selected monitoring camera.

16. The display apparatus according to claim 1, wherein the model module is configured to set the magnification of the model, wherein the magnification reproduces, in the model, the at least one adjacent monitoring camera of the monitoring cameras that is within the predefined distance of the selected monitoring camera.

* * * * *